United States Patent
Jänker et al.

[11] Patent Number: 5,902,006
[45] Date of Patent: May 11, 1999

[54] ADJUSTABLE SHAPE PART FOR AN INTERIOR OF A MOTOR VEHICLE

[75] Inventors: Peter Jänker, Garching; Willi Martin, Reichertshausen; Herbert Mehren, Stuttgart, all of Germany

[73] Assignee: Daimler-Benz AG, Stuttgart, Germany

[21] Appl. No.: 08/773,497

[22] Filed: Dec. 23, 1996

[30] Foreign Application Priority Data

Dec. 23, 1995 [DE] Germany .................. 195 48 714

[51] Int. Cl.$^6$ ............................................. B60J 9/00
[52] U.S. Cl. .................. 296/153; 296/196.7; 180/315
[58] Field of Search ..................... 296/153, 146.7; 180/315

[56] References Cited

U.S. PATENT DOCUMENTS

| | | |
|---|---|---|
| 4,993,747 | 2/1991 | Borlinghaus . |
| 5,448,028 | 9/1995 | Filion et al. ................. 296/153 X |
| 5,626,382 | 5/1997 | Johnson et al. .............. 296/153 X |
| 5,704,579 | 1/1998 | Celentino et al. ........... 248/311.2 |

FOREIGN PATENT DOCUMENTS

| | | |
|---|---|---|
| 28 28 781 A1 | 1/1980 | Germany . |
| 2828781A1 | 1/1980 | Germany . |
| 2133294 | 7/1984 | United Kingdom . |
| 2169541 | 7/1986 | United Kingdom . |
| 2169839 | 7/1986 | United Kingdom . |

OTHER PUBLICATIONS

Search Report Feb. 13, 1997 Great Britain.

*Primary Examiner*—Joseph D. Pape
*Attorney, Agent, or Firm*—Evenson, McKeown Edwards & Lenahan P.L.L.C.

[57] ABSTRACT

An ergonomically shaped exterior contour of a vehicle interior handle area, support area, or resting area is provided. The contour is formed by a flexible shaped element filled with an electro-rheologic fluid to which an electrical circuit operable from the interior is connected to reduce or increase the internal friction of the fluid to accommodate changes in shape of the contour.

18 Claims, 2 Drawing Sheets

ADJUSTABLE SHAPE PART FOR AN INTERIOR OF A MOTOR VEHICLE

BACKGROUND AND SUMMARY OF THE INVENTION

The invention relates to a functional part for an interior of a motor vehicle with an ergonomically shaped external contour, at least in a handle area, and with a support area or resting area for a vehicle occupant.

A functional part of this general type in the form of a shift lever is known from German Patent Document DE 28 28 781 A1. The shift lever is located in a manner known of itself in the interior of a motor vehicle and has an ergonomically shaped handle area to increase gripping security for the vehicle occupant during gear-shifting movements. However, when the vehicle is operated by different persons of different sizes and especially with different hand sizes, the majority of these persons cannot use the ergonomically shaped handle, since it is adjusted for only one single specific hand size.

An object of the invention is to create a functional part of the type recited at the outset that is individually adjustable for different vehicle occupants.

This object is achieved according to preferred embodiments of the invention by virtue of the fact that the handle area, the support area, or the resting area are formed by a flexible molded element filled with an electro-rheologic fluid, to which an electrical circuit, operable from the interior, is connected for reducing and increasing the internal friction of the fluid. Electro-rheologic fluids have the property that their internal friction is increased or decreased, depending on the type of fluid, when an electrical voltage is applied. As a result, a vehicle occupant can modify and form the shape of the handle area of a shift lever, an operating lever, a shift knob or rotary knob, or a steering wheel within certain limits in an individual manner, with the shaped element freezing in the selected form after the electrical voltage is removed when the electro-rheologic fluid with an inverse effect is used. Similarly, the supporting or resting areas of armrests and seats in vehicle interiors as well as headrests can be adapted individually. The solutions according to the invention therefore make it possible to provide individually adjustable shape operating elements, supporting and resting parts of vehicle seats, and portions of vehicle interior trim, so that both the operating comfort and the aesthetic design of the corresponding functional parts of the vehicle interior can be changed in suitable fashion.

In one embodiment of the invention, the flexible shaped element is formed by a plastic sheath provided with a closed cavity to receive the electro-rheologic fluid. This is an especially simple yet functionally reliable design.

In another embodiment of the invention, the flexible shaped element has a deformability that is restricted to certain contours. The limitation of deformability has the advantage that the functional reliability of the functional part cannot be adversely affected by the individual shape of the corresponding areas of its external contour.

In another embodiment of the invention, reduction of internal friction can be triggered by an impact sensor integrated into the vehicle and connected to the electrical circuit. As a result, the shaped element filled with electro-rheologic fluid also serves as an impact-energy-absorbing element, since impact energy can be absorbed when the shaped element is in the flexible state. Consequently, the risk of injury to occupants is reduced by a corresponding functional part in the shape of an operating element, a part of the interior trim, or other suitably designed parts.

Other objects, advantages and novel features of the present invention will become apparent from the following detailed description of the invention when considered in conjunction with the accompanying drawings.

DETAILED DESCRIPTION OF THE DRAWINGS

Figures 1A, 1B:
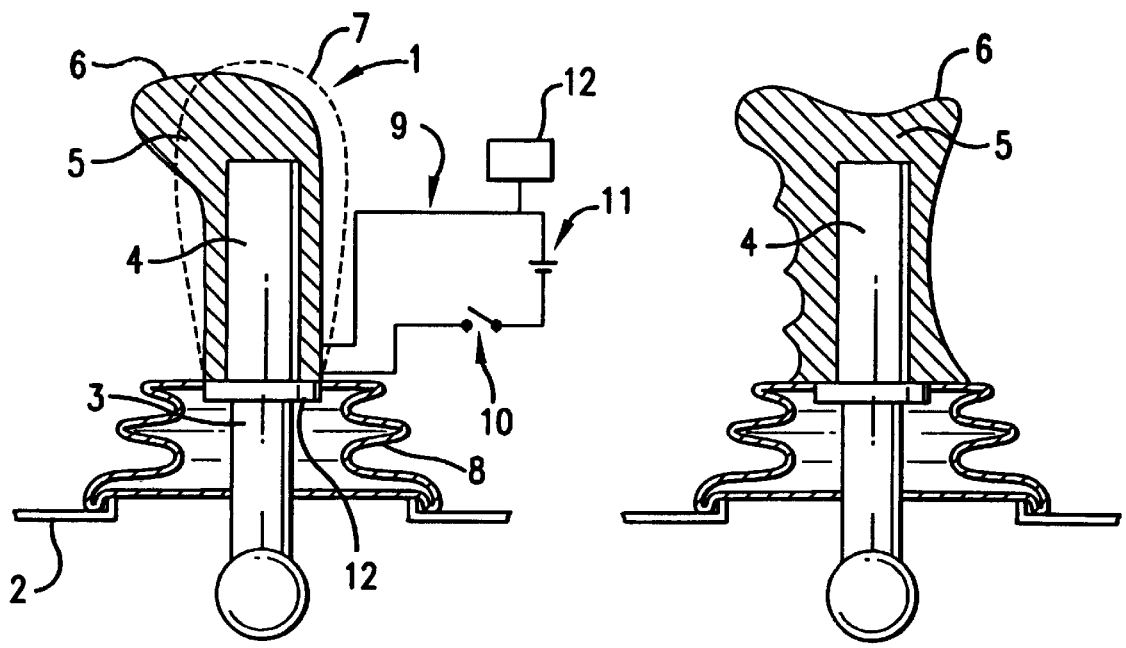
FIGS. 1a to 1c are schematic, part sectional views of a functional part that is designed as a shift lever, with the handle area of the shift lever being shown with differently shaped contours, constructed according to a preferred embodiment of the present invention.
Figure 1C:
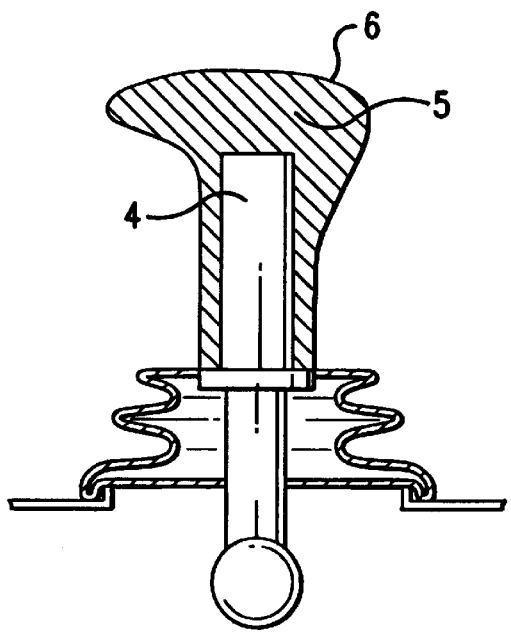

A shift lever (1) according to FIGS. 1a to 1c serves in a manner known of itself for operating a transmission of a motor vehicle, especially an automobile. Shift lever (1) is located in the vicinity of a center console (2), integral with the vehicle, in a motor vehicle interior and has a stable basic structure in the form of a rod element (3, 4) divided into a lower rod part (3) and an upper rod part (4). An elastic sleeve (8) surrounds lower rod part (3) and closes the opening in center console (2). A radially projecting stable annular collar (12) is provided to divide rod element (3, 4) about halfway up. A handle area (5, 6) is mounted on upper rod part (4), said area surrounding rod part (4). Handle area (5, 6) forms an ergonomically shapeable external contour and has a flexible shaped element in the form of a plastic sheath (6) that fits tightly in the vicinity of annular collar (12) and forms a closed cavity around rod part (4). The closed cavity inside plastic sheath (6) is filled with an electro-rheologic fluid (5).

An electrical voltage can be applied to electro-rheologic fluid (5) by an electrical circuit (9) shown schematically in FIG. 1a. Electrical circuit (9) has a switch (10) operable from the interior of the vehicle. A voltage source (11) is integrated into electrical circuit (9). Therefore, as soon as switch (10) is closed, an electrical voltage is applied to electro-rheologic fluid (5), so that the internal friction of electro-rheologic fluid (5) decreases. As a result, the external contour of filled plastic sheath (6) becomes flexible and can be shaped individually. The individual degree of deformability of plastic sheath (6) and electro-rheologic fluid (5) is established by deformation limits (7). After the electrical voltage is removed, in other words after switch (10) is opened, the internal friction increases, so that the handle area freezes in the shape it was last given.

FIGS. 1b and 1c show two different shapes into which handle area (5, 6) can be formed after the application of a voltage by means of electrical circuit (9). To shape and individually design the handle area of shift lever (1), a vehicle occupant merely operates switch (10) located in the interior, preferably in the vicinity of the dashboard, causing electro-rheologic fluid (5) to become soft. After the handle area has been manually shaped to the desired shape, electrical switch (10) is turned off again, causing the handle area to freeze in its selected form.

Figure 2:
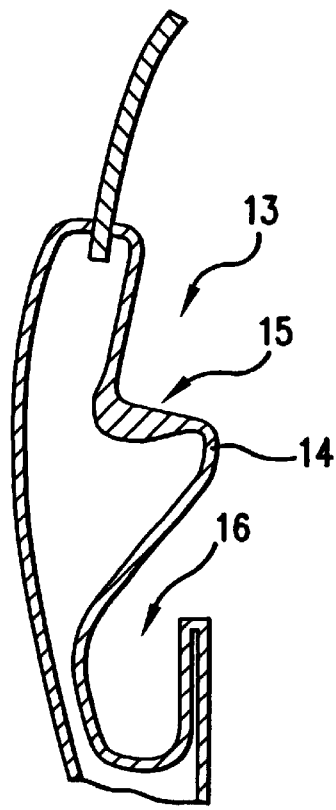
FIG. 2 is a schematic cross section through a motor vehicle door whose interior is formed as a functional part in the form of a part of the interior trim with an armrest filled with an electro-rheologic fluid, constructed according to another preferred embodiment of the present invention.
Figure 3:
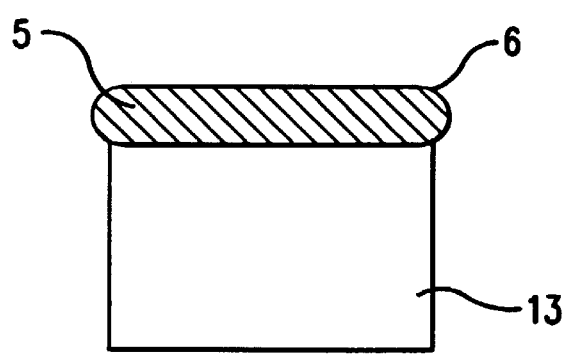
FIG. 3 is a schematic view of a functional part that may be designed, for example, as a knob, steering wheel, seat, or headrest with an electro-rheologic fluid constructed according to the present invention.

A motor vehicle door (13) according to FIG. 2 is provided with a part of the interior trim that has a side pocket (16) in a lower area and an armrest (14) in a middle area. The top of armrest (14) has a resting area (15) formed by a depression filled with an electro-rheologic fluid. The depression is sealed off by a plastic sheath so that the electro-rheologic fluid is located in a closed cavity. In this embodiment as well, the electro-rheologic fluid can be energized by an electrical voltage, but in a manner not shown, whereupon armrest (15) provided for the elbow of a vehicle occupant becomes flexible and can adapt ergonomically and individually to the shape of the elbow.

Shift lever (1) according to FIG. 1a and 1c and armrest (15) according to FIG. 2 constitute only two selected embodiments of functional parts according to the invention. In similar fashion however, other functional parts (13) in the form of operating levers and shift or rotary knobs, a steering wheel, or seats and headrests, can be designed accordingly. If the electrical circuit to which the electro-rheologic fluid is connected is additionally coupled with a delay sensor (12) that responds to impact loads on the motor vehicle, it is possible to make the handle areas, support areas, or resting areas of the various functional parts soft and flexible at the moment of a vehicle impact, so that the danger of injury to vehicle occupants from these functional parts is reduced. The electro-rheologic fluid has energy-absorbent functions in this case.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Functional part for an interior of a motor vehicle with an ergonomically shaped external contour at least in a handle area or a support area or resting area for a vehicle occupant, wherein the handle area or the support or resting area is formed by a flexible shaped element filled with an electro-rheologic fluid, to which element an electrical circuit operable from the interior is connected to reduce or increase the internal friction of electro-rheologic fluid.

2. Functional part according to claim 1, wherein the flexible shaped element is formed by a plastic sheath provided with a closed cavity to receive electro-rheologic fluid.

3. Functional part according to claim 2, wherein the flexible shaped element has a deformability established by to certain contours.

4. Functional part according to claim 1, wherein the reduction of internal friction in the fluid can be triggered by an impact sensor integrated into the vehicle, said sensor being connected to the electrical circuit.

5. Functional part according to claim 2, wherein the reduction of internal friction in the fluid can be triggered by an impact sensor integrated into the vehicle, said sensor being connected to the electrical circuit.

6. Functional part according to claim 1, wherein the reduction of internal friction in the fluid can be triggered by an impact sensor integrated into the vehicle, said sensor being connected to the electrical circuit.

7. A vehicle interior assembly comprising:

a flexible sheath, electro-rheologic fluid in the flexible sheath, and an electric circuit operable on the fluid to controllably adjust the rigidity of the fluid.

8. An assembly according to claim 7, wherein said sheath and fluid form an ergonomically shaped external contour engageable in use by a vehicle occupant.

9. An assembly according to claim 8, wherein said contour forms a handle portion of a vehicle occupant operable part.

10. An assembly according to claim 9, wherein said part is a vehicle shifting lever.

11. An assembly according to claim 9, wherein said part is a vehicle steering wheel.

12. An assembly according to claim 8, wherein said contour forms part of a vehicle arm rest.

13. An assembly according to claim 8, wherein said contour forms part of a vehicle seat.

14. An assembly according to claim 8, wherein said contour forms part of a vehicle seat head rest.

15. An assembly according to claim 8, wherein said electric circuit is manually controllable by a vehicle occupant to accommodate adjustment of an ergonomically shaped external contour defined by portions of the sheath.

16. An assembly according to claim 8, comprising a crash sensor connected with the electric circuit and operable to reduce the rigidity of the fluid in an event of a predetermined acceleration change of a vehicle containing the assembly.

17. An assembly according to claim 12, comprising a crash sensor connected with the electric circuit and operable to reduce the rigidity of the fluid in an event of a predetermined acceleration change of a vehicle containing the assembly.

18. An assembly according to claim 13, comprising a crash sensor connected with the electric circuit and operable to reduce the rigidity of the fluid in an event of a predetermined acceleration change of a vehicle containing the assembly.

* * * * *